US008046577B2

(12) United States Patent
Henry et al.

(10) Patent No.: US 8,046,577 B2
(45) Date of Patent: Oct. 25, 2011

(54) SECURE IP ACCESS PROTOCOL FRAMEWORK AND SUPPORTING NETWORK ARCHITECTURE

(75) Inventors: Paul Shala Henry, Holmdel, NJ (US); Hui Luo, Marlboro, NJ (US); Bruce Edwin McNair, Holmdel, NJ (US); Nemmara K. Shankaranarayanan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 1274 days.

(21) Appl. No.: 10/317,694

(22) Filed: Dec. 12, 2002

(65) Prior Publication Data
US 2003/0172144 A1    Sep. 11, 2003

Related U.S. Application Data

(60) Provisional application No. 60/339,956, filed on Dec. 12, 2001.

(51) Int. Cl.
*H04L 29/06* (2006.01)
(52) U.S. Cl. ........................................ 713/151
(58) Field of Classification Search ........................ None
See application file for complete search history.

(56) References Cited

U.S. PATENT DOCUMENTS

| | | | | |
|---|---|---|---|---|
| 5,968,126 A * | 10/1999 | Ekstrom et al. | ................ | 709/225 |
| 5,968,128 A * | 10/1999 | Lauck et al. | ................... | 709/232 |
| 6,101,543 A * | 8/2000 | Alden et al. | ................... | 709/229 |
| 6,704,789 B1 * | 3/2004 | Ala-Laurila et al. | ........... | 709/230 |
| 6,772,331 B1 * | 8/2004 | Hind et al. | ...................... | 713/151 |
| 6,937,566 B1 * | 8/2005 | Forslow | .......................... | 370/231 |
| 6,938,154 B1 * | 8/2005 | Berson et al. | .................. | 713/156 |
| 6,950,862 B1 * | 9/2005 | Puthiyandyil et al. | ........ | 709/220 |
| 7,451,312 B2 * | 11/2008 | Medvinsky et al. | ........... | 713/168 |
| 7,502,929 B1 * | 3/2009 | Schnizlein et al. | ............ | 713/168 |
| 2001/0047484 A1 * | 11/2001 | Medvinsky et al. | ........... | 713/201 |
| 2002/0035624 A1 * | 3/2002 | Kim | .............................. | 709/222 |
| 2002/0076054 A1 * | 6/2002 | Fukutomi et al. | .............. | 380/277 |
| 2002/0078464 A1 * | 6/2002 | Dravida et al. | ................ | 725/105 |
| 2002/0188868 A1 * | 12/2002 | Budka et al. | ................... | 713/201 |
| 2003/0172307 A1 * | 9/2003 | Henry et al. | .................... | 713/201 |

OTHER PUBLICATIONS

"Authenticated DHCP IETF DHC Working Group Interim Meeting" Jun. 4-5, 1998, pp. 3-10.*
Droms et al., RFC 3118, Jun. 2001, Cisco Systems, pp. 1-8.*

(Continued)

*Primary Examiner* — Jung Kim
*Assistant Examiner* — Nadia Khoshnoodi
(74) *Attorney, Agent, or Firm* — Myers Bigel Sibley & Sajovec, P.A.

(57) ABSTRACT

A protocol framework for a Secure IP Access (SIA) method, and supporting components deployed on IP hosts and IP networks. Using this method, an IP host can establish a secure data channel within an IP network over an insecure shared link while requesting IP address and networking configuration parameters from the IP network. A system administrator can implement strong access control against various attacks that an edge IP network may have to face, such as a denial-of-service attack that exhausts assignable IP addresses. This is a lightweight, scalable, and backward-compatible solution that can improve security performance for public and corporate LANs having open access such as wireless access points and Ethernet jacks.

18 Claims, 5 Drawing Sheets

OTHER PUBLICATIONS

Prepared by the LAN MAN Standards Committee of the IEEE Computer Society. "Draft Supplement to Standard for Telecommunications and Information Exchange Between Systems—LAN/MAN Specific Requirements—Part II: Wireless Medium Access Control (MAC) and physical layer (PHY) specifications: Specification for Enhanced Security", P802.IIi/D3.0, Nov. 2002 DS5909.

"Dynamic Host Configuration Protocol," by R. Droms, Network Working Group, Request for Comments: 2131, Obsoletes: 1541, Category: Standards Track, Bucknell University, Mar. 1997.

"Authentication for DHCP Messages," by R. Droms, Editor, Cisco Systems, W. Arbaugh, Editor, University of Maryland, Network Working Group, Request for Comments: 3118, Category: Standards Track, Jun. 2001, http://rfc3118.x42.com/.

T Mobile HotSpot, Welcome to T-Mobile HotSpot, http://www.t-mobile.com/hotspot/, 2 pages.

IEEE Standard for Local and metropolitan area networks, "Port-Based Network Access Control," IEEE Std 802.1x-2001.

"A Method For Transmitting PPP Over Ethernet (PPPoE)," L. Mamakos, K. Lidl, J Everts, UUNET Technologies, Inc., D. Carrel, D. Simone, RedBack Networks, Inc., R. Wheeler, RouterWare, Inc., Network Working Group, Request for Comments: 2516, Category: International, Feb. 1999, http://asg.web.cmu.edu/rfc/rfc2516.html.

"An Ethernet Address Resolution Protocol," or "Converting Network Protocol Addresses to 48.bit Ethernet Address for Transmission on Ethernet Hardware," by David C. Plummer (DCP@MIT-MC), Network Working Group, Request For Comments: 826, Nov. 1982, http://www.faqs.org/rfcs/rfc826.html.

"Security Architecture for the Internet Protocol," S. Kent, BBN Corp., R. Atkinson, @Home Network, Network Working Group, Request for Comments: 2401, Obsoletes: 1825, Category: Standards Track, Nov. 1998, http://www.cis.ohio-state.edu/cgi-bin/rfc/rfc2401.html.

"Remote Authentication Dial In User Service (RADIUS)," C. Rigney, S. Willens, Livingston, A. Rubens, Merit, W. Simpson, Daydreamer, Network Working Group, Request for Comments: 2865, Obsoletes:, 2138, Category: Standards Track, Jun. 2000, http://www.ietf.org/rfc/rfc2865.txt.

"Diameter Base Protocol," Pat R. Calhoun, Sun Microsystems, Inc., Haseeb Akhtar, Nortel Networks, Jari Arkko, Oy LM Ericsson Ab, Erik Guttman, Sun Microsystems, Inc., Allan C. Rubens, Tut Systems, Inc., Glen Zorn, Cisco Systems, Inc., AAA Working Group, Internet-Draft, Category: Standards Track, Jul. 2001, http://www.interlinknetworks.com/images/resource/rfc/diameter/draft-ietf-aaa-diameter-0.

* cited by examiner

SECURE IP ACCESS PROTOCOL FRAMEWORK AND SUPPORTING NETWORK ARCHITECTURE

The present application claims priority to Provisional U.S. Appl. Ser. No. 60/339,956, filed Dec. 12, 2001, entitled A CONFIDENTIAL IP ACCESS PROTOCOL FRAMEWORK AND SUPPORTING NETWORK ARCHITECTURE, the disclosure of which is hereby incorporated herein.

FIELD OF THE INVENTION

The present invention relates generally to network access, and more particularly, to a method and architecture for enabling an IP host to establish a secure data channel with a secure DHCP server on an IP network over an insecure shared link, while the IP host requests an IP address and networking configuration parameters from the secure DHCP server the IP network, and, consequently, to establish a secure data channel with any other IP host on the IP network while the IP host explores the MAC address of the other IP host.

BACKGROUND

Currently there are several methods for an IP host to initialize IP networking with an IP network over a shared link, but they either lack security functions or suffer a routing efficiency problem. These methods and their problems are briefly summarized below.
  (1) Using DHCP to request an IP address and network configuration parameters from a DHCP server on the IP network. This method by itself does not offer any security solutions.
  (2) Using a static IP address and broadcasting it to the IP network using gratuitous ARP messages. This method by itself does not offer any security functions.
  (3) Using PPPoE to authenticate the IP host to a PPPoE server on the IP network and to receive an IP address and network configuration parameters after the authentication succeeds. Optionally, the PPPoE server can be co-located on the gateway router, and the data frames between the IP host and the gateway router can be encrypted using a per-user per-session key. This method offers good security protection when encryption is used, but it suffers a routing efficiency problem if the majority of communications are between IP hosts on the shared link. In this case, all host-to-host communications have to go through the gateway router for decryption and re-encryption, and thus the gateway router can be easily overloaded.
  (4) Using a static IP address or DHCP over link-layer access control and encryption mechanisms, such as 802.1x and 802.11i in the case of an IEEE 802.11 wireless LAN. This method offers good security protection (assuming the WEP security flaws are fixed by 802.11i), but suffers the same routing efficiency problem if the majority of communications occur between IP hosts associated with the same access point.

SUMMARY OF THE INVENTION

In accordance with an aspect of the present invention, there is provided a protocol framework for a Secure IP Access (SIA) method, and supporting components deployed on IP hosts and IP networks. Using this method, an IP host can establish a secure data channel within an IP network over an insecure shared link while requesting IP address and networking configuration parameters from the IP network. A system administrator can implement strong access control against various attacks that an edge IP network may have to face, such as a denial-of-service attack that exhausts assignable IP addresses. This is a lightweight, scalable, and backward-compatible solution that can improve security performance for public and corporate LANs having open access such as wireless access points and Ethernet jacks.

The SIA protocol framework in accordance with the invention, when augmented with the proper cryptography algorithms, is designed to address the above problems at the network layer. It is based on new security options attached to DHCP and ARP messages, and involves deploying SIA clients and servers on IP hosts and networks, respectively. The SIA client is preferably implemented as an intermediate driver that can control all network interface cards for an IP host. The SIA server is a combination of an enhanced DHCP server, an authentication proxy, and a localized VPN server. Using DHCP security options, a SIA client can accomplish mutual authentication and key exchange with a SIA server while it requests IP address and networking configuration parameters for the IP host. As soon as the configuration phase finishes, the IP host can receive/send encrypted IP packets from/to the IP network via the SIA server using the exchanged key. If an IP host wants to communicate with another IP host on the same subnet, the SIA client on this IP host can use ARP security options to accomplish mutual authentication and key exchange with the SIA client on the other IP host while it resolves the MAC address of that IP host, and encrypted host-to-host communications can follow immediately. Security protection is established at the very beginning of the DHCP handshake, so that an IP host is well protected from potential network-based attacks that could come from the insecure link. In addition, these security protections are established without generating extra packets between IP hosts and networks.

In accordance with an aspect of the present invention, there is provided a method for an IP host to authenticate to an IP network, comprising the steps of: (a) broadcasting a DHCP_DISCOVERY message including an option specifying at least one of a host-to-network authentication method, network-to-host authentication method, key exchange algorithm, and encryption algorithm; (b) receiving a DHCP_OFFER message including an option confirming at least one of the host-to-network authentication method, network-to-host authentication method, key exchange algorithm, and encryption algorithm, wherein the DHCP_OFFER message does not allocate an IP address to the IP host; (c) sending a DHCP_REQUEST message including authentication credentials; and (d) receiving a DHCP_ACK message.

In accordance with another aspect of the invention, there is provided a method for a first IP host to authenticate to a second IP host on the same link of an IP network, comprising the steps of: (a) sending a DHCP_INFORM message including an option specifying the IP address of the second IP host; (b) receiving a DHCP_ACK message including an option containing a security token for establishing a secure data channel between the first and second IP hosts; (c) broadcasting an ARP request message including an option containing authentication credentials derived from the security token; and (d) receiving an ARP response message.

The present invention will now be described with particular reference to the accompanying drawings.

DETAILED DESCRIPTION OF THE PREFERRED EMBODIMENTS

Figure 1:
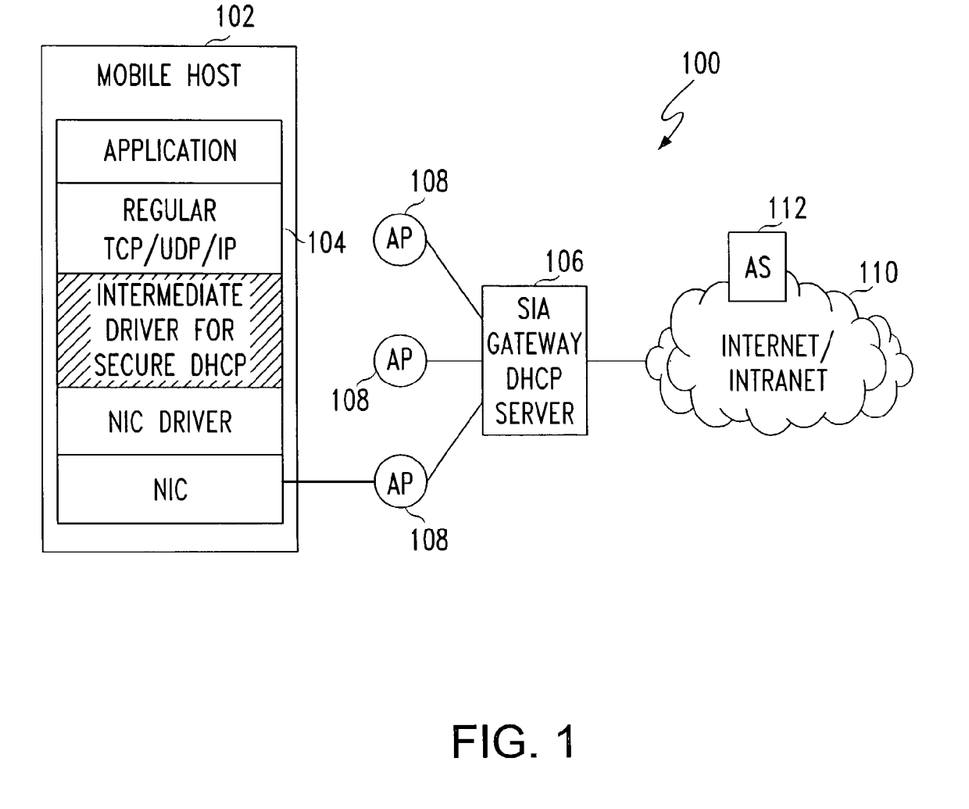
FIG. 1 is a schematic of a first network architecture.

With reference to the several views of the drawings, a WLAN is used as an illustrative example for a Secure IP Access (SIA) method with five exemplary supporting network architectures. For the purpose of description, it is assumed that the WLAN does not implement any link-layer authentication and encryption mechanisms. Referring to FIG. 1, there is depicted a first illustrative embodiment of a network architecture 100 in accordance with an aspect of the invention. Each wireless host 102 includes a SIA client 104 that facilitates several functions described in greater detail below. The SIA client may be implemented as an "intermediate driver," as described in detail in co-owned U.S. patent application Ser. No. 10/138,129, filed May 5, 2002, the disclosure of which is incorporated herein by reference. A SIA server 106 is combines three entities: an authentication entity, an enhanced DHCP entity, and a VPN entity. Each entity has different work modes, depending on the network topology. The authentication entity can function as an authentication server or an authentication proxy. The enhanced DHCP entity can function as a DHCP server or a DHCP proxy. The VPN entity can function as a VPN bridge, a VPN server, or a VPN gateway router. In most of cases, the authentication entity operates as an authentication proxy, since authentication is generally implemented at a centralized authentication server 112. In the embodiment of FIG. 1, all access points 108 are connected to the SIA server 106 that in turn is connected to the Internet or an intranet shown generally at 110. An authentication server is represented at 112. The wireless hosts 102 form a subnet. The SIA server 106 operates as an enhanced DHCP server and a VPN gateway router. For every admitted wireless host 102, all outbound and inbound packets are communicated to and from the SIA server 106 or other wireless hosts 102 on the subnet using an encrypted packaging structure. If an inbound packet comes from a host out of the subnet, it is forwarded to the wireless host 102 after being encrypted by the SIA server 106. If an outbound packet is sent to a host out of the subnet, it is forwarded to that host as a regular packet after being decrypted by the SIA server 106. Every unicast packet transmitted between a host 102 and the SIA server 106 is encrypted using the shared key that is established during the DHCP process. Every broadcast packet transmitted between a host 102 and the SIA server 106 is encrypted using a common secret key. In this network topology, every access point must be directly wired to the SIA server.

Figure 2:
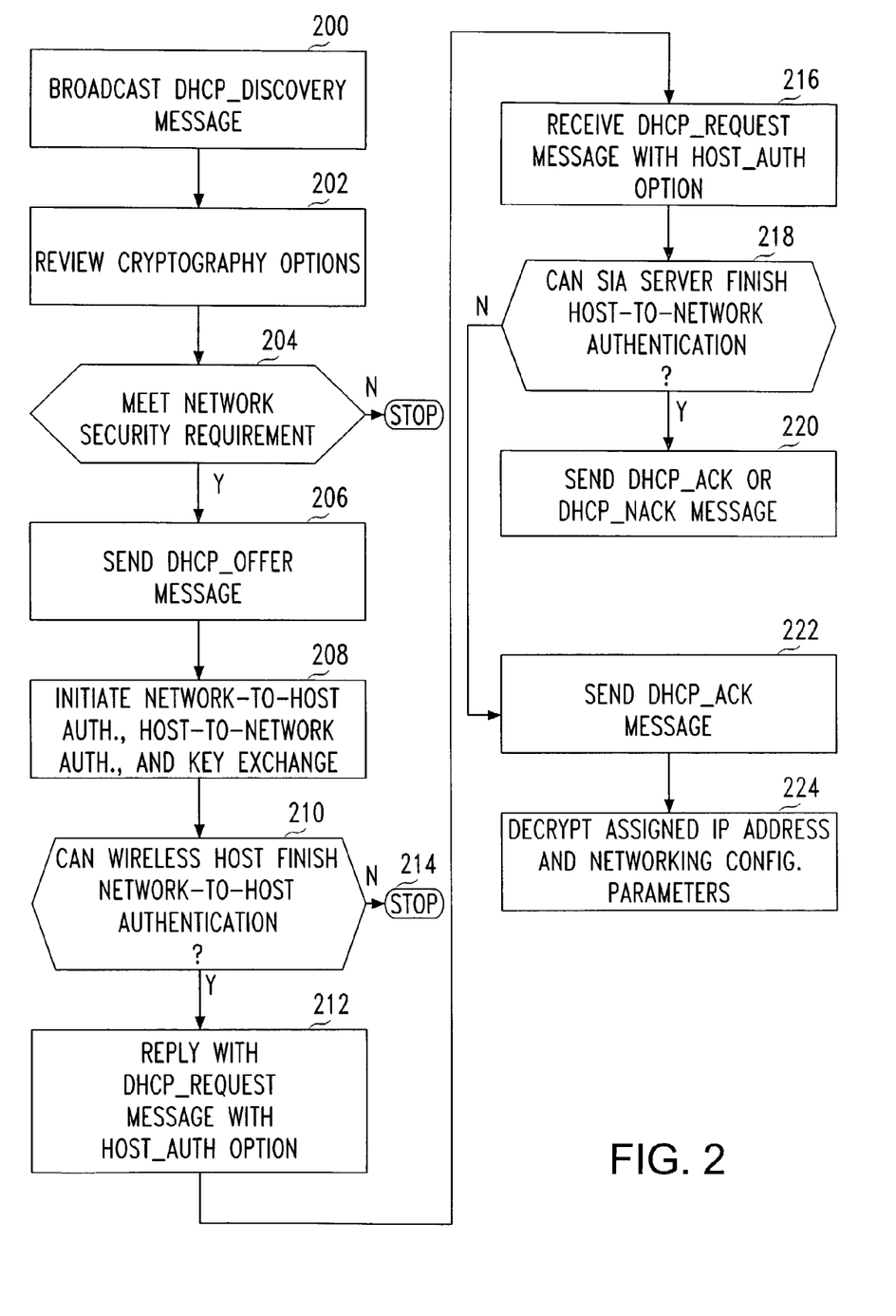
FIG. 2 is a flow diagram of an illustrative secure IP access protocol in accordance with an aspect of the invention.

An illustrative SIA protocol is described as follows and illustrated in the flow diagram of FIG. 2. It is assumed that a wireless host is configured to use DHCP to obtain an IP address and network configuration parameters. The wireless host includes a SIA client as described above. The secure IP access procedure between its SIA client and a SIA server on an IP network consists of the following steps (for the sake of simplicity, we do not consider the protocol conversation involving the regular DHCP server and authentication server when the SIA server works as an enhanced DHCP proxy and an authentication proxy).

At 200, a wireless host broadcasts a DHCP_DISCOVERY message with 0.0.0.0 and FF.FF.FF.FF as the source and destination IP addresses respectively. The source MAC address is the host's MAC address, and the destination MAC address is a broadcast MAC address (which is FF.FF.FF.FF.FF.FF for Ethernet). A HOST_HELLO option is included in this message, which specifies a number of cryptography options, including host-to-network authentication method, network-to-host authentication method, key exchange algorithm, encryption algorithm, etc. Host-to-network authentication, network-to-host authentication, and key exchange may be carried out using a single algorithm, such as SRP (Secure Remote Password Protocol). This option is also used to test whether a responding DHCP server is a SIA server. In this regard, if the network only has a conventional DHCP server, it would not understand this option and therefore could not respond properly. If this is the case, the SIA client will determine whether to continue the IP networking procedure using the conventional DHCP protocol. For example, if a SIA server is recommended but not required according to the configuration, the SIA client can be configured to continue with the conventional DHCP process, and display a warning message to the mobile user.

At 202, after receiving the DHCP_DISCOVERY message with the HOST_HELLO option, the SIA server reviews all cryptography options proposed by the wireless host. If at 204 they meet the network's security requirements, the SIA server replies at 206 with a DHCP_OFFER message with a NETWORK_HELLO option and closes the negotiation on cryptography algorithms. This DHCP_OFFER message is different from the one in the conventional DHCP protocol. It neither allocates an IP address nor passes any configuration parameters to the host, because the host has not been authenticated to the network yet. Instead, the destination IP address for this DHCP_OFFER message is 0.0.0.0. At 208, the SIA server starts the network-to-host authentication, host-to-network authentication, and key exchange processes by using a NETWORK_AUTH option.

After receiving the DHCP_OFFER message with the NETWORK_HELLO option and the NETWORK_AUTH option, if the wireless host can finish network-to-host authentication at 210, it should either reply at 212 with a DHCP_REQUEST message with a HOST_AUTH option to the SIA server (for positive authentication result). Otherwise at 214 it silently aborts the access procedure (for a negative authentication result). The HOST_AUTH option contains the responding parameters to the NETWORK_AUTH option according to the cryptography algorithms specified in the NETWORK_HELLO option. In addition, if the wireless host can finish key exchange at this moment, it should also include a HOST_FINISH option. The source IP address of this DHCP_REQUEST message remains 0.0.0.0.

After receiving the DHCP_REQUEST message at 216 with the HOST_AUTH option and, possibly, the HOST_FINISH option. If the SIA server can finish the host-to-network authentication at 218, it sends either a DHCP_ACK message (for positive authentication result) or a DHCP_NACK message (for negative authentication result) back to the wireless host at 220. If the SIA server cannot finish the host-to-network authentication (but it should be ready to generate a session key shared with the wireless host), it sends a DHCP_ACK message to the wireless host at 222. It is possible that the SIA server cannot finish the user-to-network authentication after receiving two messages, DHCP_DISCOVER and DHCP_REQUEST, from a SIA client. If this is the case, the SIA client will send a unicast gratuitous ARP message to the SIA server to finish the host-to-network authentication. Hence, the SIA server should send back a DHCP_ACK message. In either of the above scenarios, if a DHCP_ACK message is sent back to the wireless host, the SIA server encrypts the assigned IP address and networking configuration parameters using the session key and sends them to the wireless host in a NETWORK_FINISH option. The destination IP address for this DHCP_ACK message is still 0.0.0.0. A common secret key is also included as a networking configuration parameter. This key is used to encrypt broadcast messages generated by admitted wireless hosts and the SIA server.

After receiving the DHCP_ACK message with the NETWORK_FINISH option, at 224 the wireless host can decrypt the assigned IP address and networking configuration parameters. It should start using the session key to drive a key-scheduling algorithm that can generate instance keys to authenticate and encrypt/decrypt every outbound/inbound packet. These packets use encrypted data structure, such as the IPsec transport mode (if source and destination IP addresses are not deemed as secrets), the IPsec encapsulation mode (if source and destination IP addresses are indeed secrets; in this case, the outer IP source and destination addresses should be 0.0.0.0 for host-to-host packets, or 0.0.0.0 and the SIA server's IP address for packets transmitted between hosts and the SIA server), or some speSIAl link-layer frame structure. If the wireless host has not yet sent a HOST_FINISH option to the SIA server, it sends a unicast gratuitous ARP message with the HOST_FINISH option to the SIA server, which competes the host-to-network authentication.

After the above secure IP access process is completed, all packets transmitted between wireless hosts or between the SIA server and wireless hosts, including other DHCP messages and all ARP messages, are encrypted. The established session key between every wireless host and the SIA server needs to be frequently updated. Normally, it is wireless hosts that start the update procedure. A wireless host can utilize DHCP_INFORM or DHCP_REQUEST messages for this purpose, which are periodically sent to the SIA server. In this case, the HOST_AUTH option and the NETWORK_AUTH option can be attached to these DHCP messages. In speSIAl scenarios, for example, where an admitted wireless host loses its access privileges while being active, the SIA server can advise every remaining wireless host on the subnet by broadcasting a DHCP_NACK message with a NETWORK_REVOKE option. As an alternative, the lease term of IP addresses assigned by the SIA server should be as short as possible, subject to no significant increment of signaling traffic. Therefore, the IP address lease extension request from an exiled host will be turn down by the SIA server shortly after the host loses its access privileges, and then it is forced out. If a wireless host is configured with a fixed IP address, it will first broadcast gratuitous ARP message on the IP network. The SIA client installed on this host can attach a HOST_HELLO option to this ARP message. After the SIA server receives the ARP message, it shall challenge the wireless host by sending back an ARP response message with a NETWORK_HELLO option and a NETWORK_AUTH option.

The rest of procedure is the same as the above procedure starting from when the wireless host receives the DHCP_OFFER message.

When an admitted wireless host wants to communicate with another admitted wireless host on the same subnet, they can set up a new session key for the communications by following the procedure described below.

(1) The initiating wireless host sends a DHCP_INFORM message to the SIA server, along with a HOST_INTRODUCE option, in which the IP address of the targeted wireless host is presented. The DHCP_INFORM message is encrypted using the session key shared between the initiating wireless host and the SIA server.

(2) After receiving the DHCP_INFORM message with the HOST_INTRODUCE option, the SIA server replies a DHCP_ACK message with a NETWORK_TOKEN option, which contains a security token, preferably a Kerberos ticket.

(3) After receiving the DHCP_ACK message with the NETWORK_TOKEN option, the initiating wireless host may broadcast (for the first time only) an ARP request message along with a HOST_AUTH option, which contains some information of the token and some parameters derived from the token.

(4) After receiving the ARP request message with the HOST_AUTH option, the targeted wireless host replies an ARP response message with a responding HOST_AUTH option, which finishes the mutual authentication and the key exchange.

These types of session keys should also be updated frequently. When an update is necessary, the initiating wireless host may go through the above procedure again, but it only sends unicast ARP messages.

Figure 3:
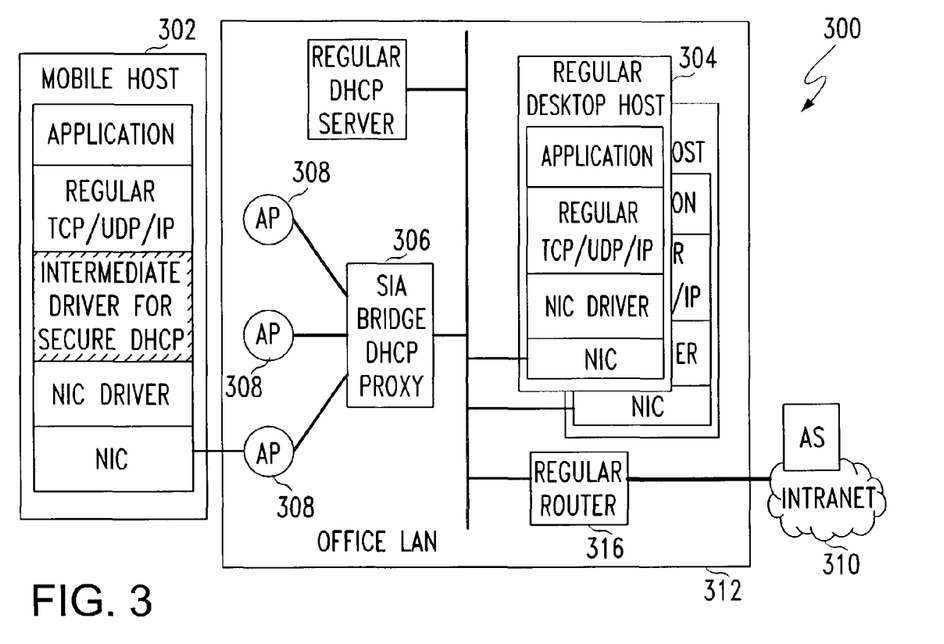
FIG. 3 is a schematic of an alternative network architecture.

Referring now to FIG. 3, there is depicted an alternative network arrangement 300 that is similar to that depicted in FIG. 1, except that the SIA server 306 operates as an enhanced DHCP proxy and a VPN bridge. A plurality of access points 308 are connected to the SIA server 306 which is part of an Office LAN 312 including a regular DHCP server 314 and router 316. The router 316 connects the LAN 312 to the Internet/intranet 310. In this case, all wireless hosts 302 are on a subnet that may include other hosts 304. Similarly, for every admitted wireless host 302, its inbound/outbound packets are transmitted from/to the SIA server or other wireless hosts 302 using an encrypted packaging structure. If an inbound packet comes from a host outside of the SIA server 306, it is forwarded to the wireless host using the encrypted packaging structure after being encrypted by the SIA server 306. If an outbound packet is sent to a host on the outside of the SIA server 306, it is forwarded to that host as a regular packet after being decrypted by the SIA server 306. Each unicast packet transmitted between a host 302 and the SIA server 306 is encrypted using the key shared between them. Every broadcast packet transmitted between a host and the SIA server is encrypted using the common secret key.

Figure 4:
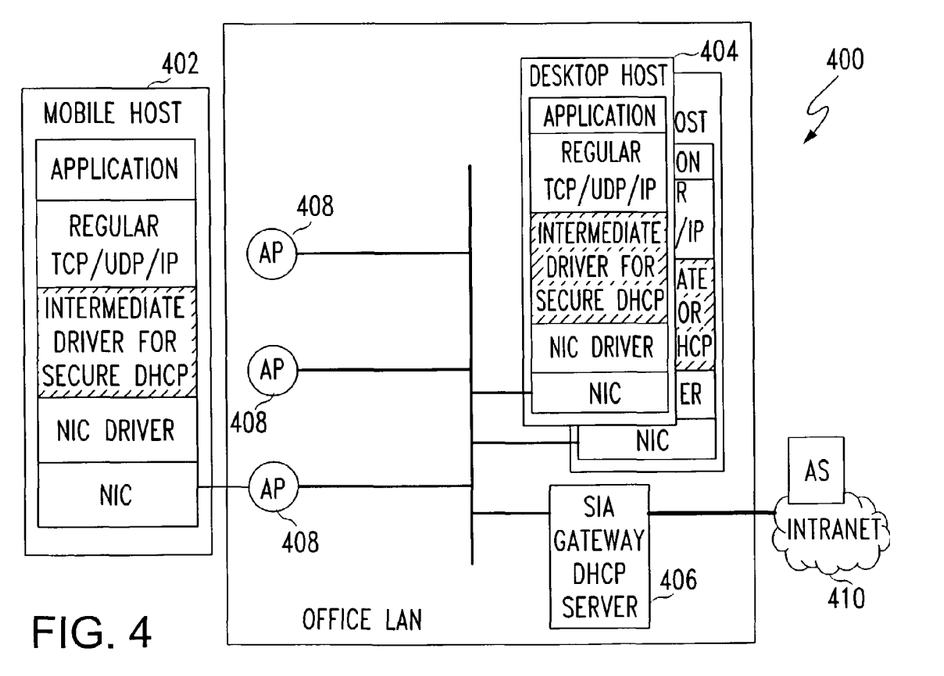
FIG. 4 is a schematic of an alternative network architecture.

Referring now to FIG. 4, there is depicted a third illustrative network arrangement 400 that directly connects all access points 408 to a corporate LAN. In this case, wireless hosts 402 and wired hosts 404 on the LAN run enhanced DHCP clients. A SIA server 406 serves as an enhanced DHCP server and a VPN gateway router for the LAN. For every admitted host, packets are exchanged with the SIA server 406 or other hosts on the subnet using an encrypted packaging structure. If an inbound packet comes from a host out of the subnet, it is forwarded to a host 402, 404 on the subnet using the encrypted packaging structure after being encrypted by the SIA server 406. If an outbound packet is sent to a host out of the subnet, it is forwarded to that host as a regular packet after being decrypted by the SIA server 406. Each unicast packet transmitted between a host 402, 404 and the SIA server 406 is encrypted using the point-to-point security assoSIAtion between them. Each broadcast packet transmitted between a host 402, 404 and the SIA server 406 is encrypted using the common secret key.

Figure 5:
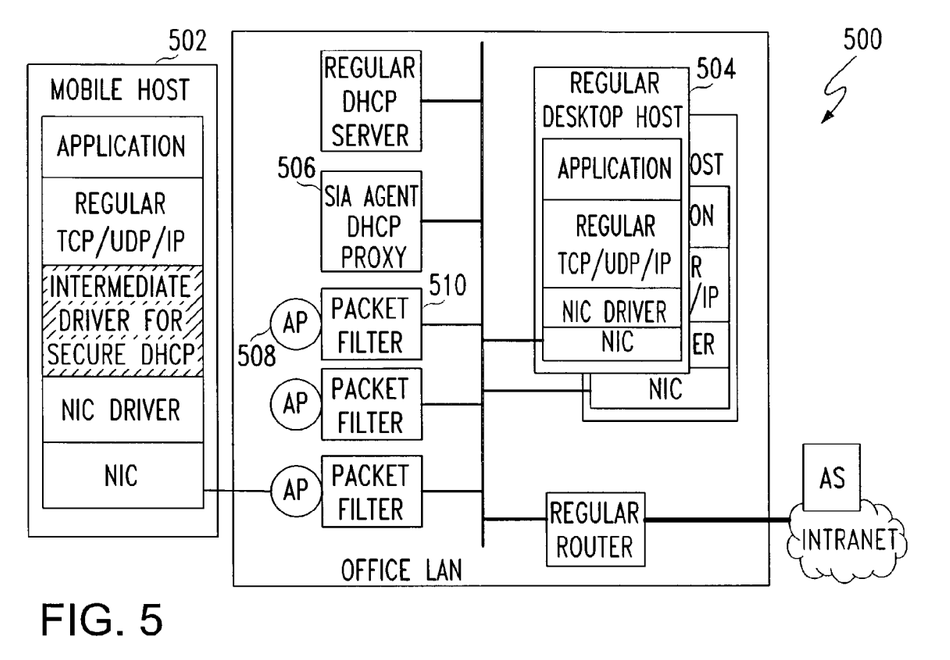
FIG. 5 is a schematic of an alternative network architecture.

Referring now to FIG. 5, a fourth network topology is depicted in which all access points are connected to a corporate LAN through a packet filter. In this expedient, the SIA server 506 operates as an enhanced DHCP proxy and a VPN server. When a wireless host 502 requests networking configuration parameters from the SIA server using enhanced DHCP security options, the SIA server 506 in turn runs conventional DHCP to apply an IP address and passes it to the wireless host 502 using enhanced DHCP security options. As a consequence, all wired hosts 504 observing the conventional DHCP conversation treat the SIA server 506 as the wireless host 502. When a wired host 504 sends packets to a wireless host 502, they go to the SIA server 506, which encrypts the packets before transmitting them to the wireless host 502. When a wireless host 502 sends packets to a wired host 504, they are sent to the SIA server 506 using an encrypted packaging structure. The SIA server 506 decrypts the packets and then forwards the decrypted packets to the wired host 504 as regular packets.

A packet filter 510 assoSIAted with an access point 508 allows certain packets to pass though. Upstream packets include unicast and broadcast packets originating from the access point (e.g., the IAPP messages), encrypted unicast packets forwarded to the SIA server or other wireless hosts, and enhanced DHCP messages with security options. Downstream packets include unicast packets sent to the access point (e.g., the SNMP messages), encrypted unicast packets sent to wireless hosts, and DHCP/ARP messages with security options. The packet filters and the SIA server must join a multicast group in order to process encrypted broadcast packets. For upstream packets, a packet filter changes the destination IP address of every encrypted broadcast packet into the multicast IP address before it puts the encrypted broadcast packet on the LAN cable. For downstream packets, a packet filter changes the multicast IP address of every encrypted broadcast packet into the broadcast IP address before it forwards the encrypted broadcast packet to the access point.

Figure 6:
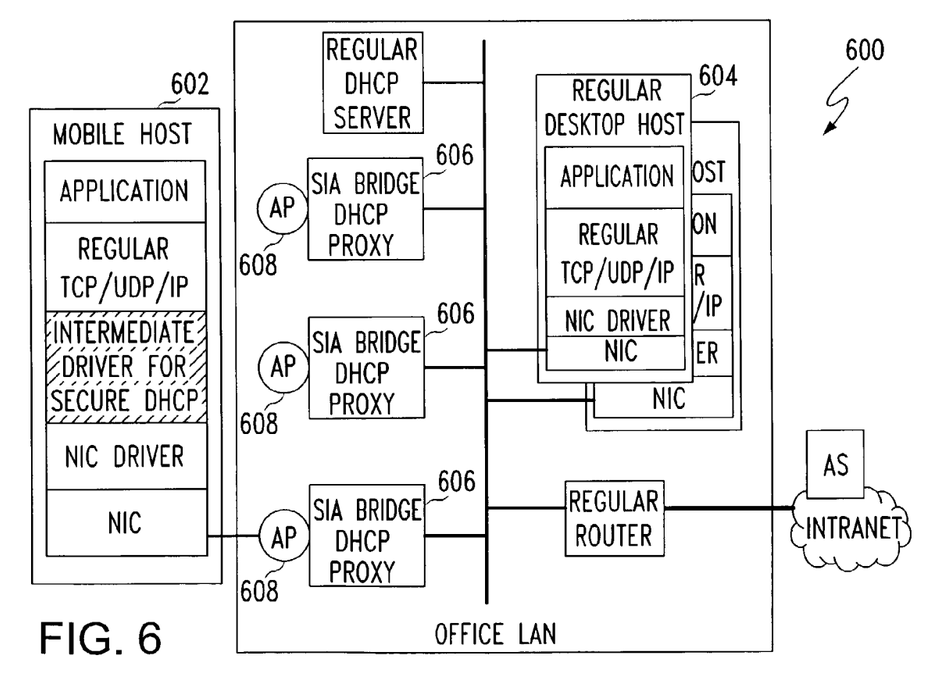
FIG. 6 is a schematic of an alternative network architecture.

Referring now to FIG. 6, there is depicted a fifth network arrangement in which a SIA server 606 is disposed behind every access point 608, and operates as an enhanced DHCP proxy and a VPN bridge. This is analogous to IEEE 802.11i, but is implemented at the network layer. Some improvements must be made to the IAPP such that the session key shared between a wireless host and a SIA server can be transferred to another SIA server after the wireless host moves into its range.

Figure 7:
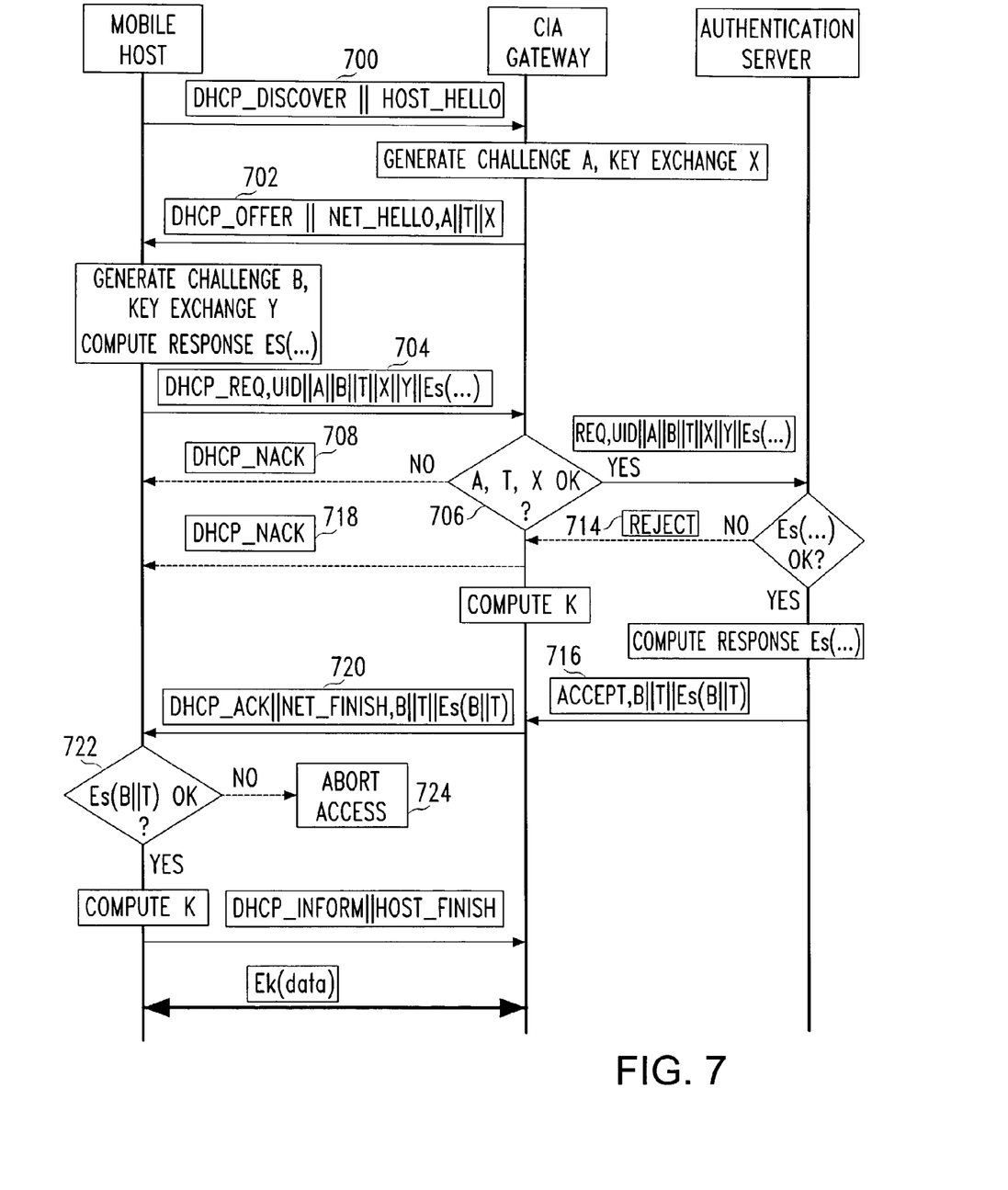
FIG. 7 is a flow diagram of a lightweight authentication protocol in accordance with an aspect of the invention.

Referring now to FIG. 7, there is depicted a flow diagram of a "lightweight" authentication protocol showing how cryptography algorithms are incorporated into the secure IP access protocol framework. This protocol is based on the assumption that a wireless host shares a high-entropy secret an authentication server. If the wireless host shares a low-entropy secret (such as a password) with the authentication server, the SRP protocol can be used as the authentication protocol, using the same protocol framework.

The authentication server can be a RADIUS or Diameter server (Diameter is the next generation of RADIUS). The security performance of this protocol relies upon the security of the physical connection to the IP access network. In other words, no rogue access point is able to connect to the network.

The authentication protocol is characterized as "lightweight" in that: (1) the SIA server neither has a public/private key pair, nor shares a secret key with the authentication server or the wireless host; and (2) there is only one round trip protocol conversation between the SIA server and the authentication server. The authentication signaling traffic between the wireless host and the authentication server is always switched by the SIA server.

Referring to FIG. 7, at 700 the wireless host broadcasts a DHCP_DISCOVER message with a HOST_HELLO option, in which it requests using the lightweight authentication protocol.

After receiving the DHCP_DISCOVER message with the HOST_HELLO option, the SIA server replies at 702 with a DHCP_OFFER message with a NETWORK_HELLO option and a NETWORK_AUTH option. The NETWORK_HELLO option is for the confirmation of using the lightweight authentication protocol. The NETWORK_AUTH option contains a one-time challenge number A and D-H key exchange triplet $<g, P, X>$. Where, $X=g^x \mod P$; x is a random secret generated by the SIA server; g is a generator; P is a prime number yielding $P=2Q+1$; and Q is a prime number.

After receiving the DHCP_OFFER message with the NETWORK_HELLO and the NETWORK_AUTH option, at 704 the wireless host sends back a DHCP_REQUEST message with a HOST_AUTH option, which contains the response to the NETWORK_AUTH option, i.e., UID∥A∥B∥X∥Y∥Es (UID∥A∥B∥X∥Y). Where, UID is the wireless host's identifier, preferably a NAI; B is another one-time challenge number; Y is a D-H key exchange parameter, $Y=g^y \mod P$; y is a random secret generated by the wireless host. At this moment, the wireless host shall be able to calculate the session key $K=X^y \mod P$.

After receiving the DHCP_REQUEST message with the HOST_AUTH option, at 706 the SIA server first verifies whether A and X in the HOST_AUTH option are identical to A and X in the previous NETWORK_AUTH option. If not, at 708 the SIA server shall reject the wireless host by replying a DHCP_NACK message. Otherwise, at 710 the SIA server sends the HOST_AUTH option to the authentication server. If the wired network between the SIA server and the authentication server is perfectly secure, the protocol conversation between these entities can be done in clear text. If discretion is of vital importance, the protocol conversation can be carried over a SSL connection without client authentication (thus no key is needed for the SIA server; although the authentication server needs to have a security certificate). At this moment, the SIA server shall be able to calculate the session key $K=Y^x \mod P$.

After receiving the HOST_AUTH option, at 712 the authentication server first verifies whether the clear text "A∥B∥X∥Y" matches the cipher text "Es(A∥B∥X ∥Y)". If it does not, at 714 the authentication server sends a "reject" response to the SIA server. Otherwise, at 716 the authentication server shall send back an "accept" response containing "B∥Es(B)".

If the authentication server issues a "reject" response, the SIA server rejects the wireless host by replying with a DHCP_ NACK message at 718. Otherwise, at 720 the SIA server sends the wireless host a DHCP_ACK message with a NETWORK_AUTH option, a NETWORK_FINISH option, and a NETWORK_CONFIG option. The NETWORK_AUTH option contains "B∥Es(B)". The NETWORK_FINISH option contains cipher text $E_K$("SRVR"). The NETWORK_CONFIG contains assigned IP address, subnet mask, default gateway router IP address, and other network configuration parameters. These are all encrypted with a session key K. The NETWORK_CONFIG message contains known or easily discernable information. Other than possibly the assigned IP address, every access device on the subnet may have access to the same information (mask, default gateway, etc). Accordingly, it is desirable to add a random nonce to increase the equivocation of the message.

After receiving the DHCP_ACK message with the NETWORK_AUTH option, the NETWORK_FINISH option, and the NETWORK_CONFIG option, at 722 the wireless host first verifies whether the challenge number B matches the response Es(B). If not, at 724 the wireless host aborts the access attempt. Otherwise, at 726 the wireless host sends a DHCP_INFORM message with a HOST_FINISH option to the SIA server. The DHCP_INFORM message contains a cipher text "Ek("CLNT") that can be packed using the IPsec transport mode.

The foregoing lightweight authentication protocol can serve as an upper layer authentication protocol if the SIA server is characterized as an 802.11i access point. Note that network-to-host authentication is not equivalent to access point-to-host authentication, because the network cannot rule out the possibility of rogue access points attaching to the network. Therefore, the access point should be authenticated to the wireless host. In order to make the access point-to-host authentication practical, the access point should share a high-entropy secret with the authentication server. In this case, Kerberos can serve as the access point-to-host authentication method if the wireless host also shares a high-entropy secret with the authentication server. Otherwise, a hybrid SRP and Kerberos protocol can be adopted.

The present invention has been shown and described in what are considered to be the most practical and preferred embodiments. It is anticipated, however, that departures may be made therefrom and that obvious modifications will be implemented by those skilled in the art.

We claim:

1. A method for a mobile wireless IP host to authenticate to an IP network, comprising:
broadcasting a dynamic host configuration protocol (DHCP)_DISCOVERY message including a HOST_HELLO message that specifies a plurality of cryptography options for the IP network including a host-to-network authentication method, network-to-host authentication method, key exchange algorithm, and encryption algorithm, wherein the DHCP_DISCOVERY message is transmitted from the mobile wireless IP host over a wireless interface to an access point;
after broadcasting the dynamic host configuration protocol (DHCP)_DISCOVERY message, receiving a DHCP_OFFER message including an option confirming the plurality of cryptography options when the plurality of cryptography options meet security requirements of the IP network, wherein the DHCP_OFFER message does not allocate an IP address to the mobile wireless IP host, wherein the DHCP_OFFER message is received at the mobile wireless IP host over the wireless interface from the access point;
after broadcasting the dynamic host configuration protocol (DHCP)_DISCOVERY message and after receiving the DHCP_OFFER message, sending a DHCP_REQUEST message including authentication credentials responsive to receiving the DHCP_OFFER, wherein the DHCP_REQUEST message is sent from the mobile wireless IP host over the wireless interface to the access point; and
after sending the DHCP_REQUEST message, receiving a DHCP_ACK message when the mobile wireless IP host is authenticated by the network, the DHCP_ACK message including a NETWORK_CONFIG option with encrypted network configuration parameters, wherein the DHCP_ACK message is received at the mobile wireless IP host over the wireless interface from the access point.

2. The method recited in claim 1, wherein the DHCP_OFFER message includes a NETWORK_AUTH option containing a challenge number A and a Diffie-Helman (D-H) key exchange triplet <g, P, X>, where, $X=g^x \bmod P$; x is a random secret generated by a secure IP access server on the network; g is a generator; P is a prime number yielding $P=2Q+1$; and Q is a prime number.

3. The method recited in claim 2, wherein the DHCP_REQUEST message includes a HOST_AUTH option including at least one of an IP host identifier, a challenge number B, and a D-H key exchange parameter Y, where $Y=g^y \bmod P$ and y is a random secret generated by the mobile wireless IP host.

4. The method recited in claim 3, further comprising calculating a session key $K=X^y \bmod P$.

5. The method recited in claim 3, wherein the DHCP_ACK message includes a NETWORK_AUTH option comprising B||Es(B), where B is enciphered with a secret key.

6. The method recited in claim 5, further comprising:
determining whether the challenge B matches the response Es(B); and
when the challenge B matches the response ES(B), sending the network a DHCP_INFORM message with a HOST_FINISH option comprising text enciphered with the session key K.

7. The method recited in claim 3, wherein the DHCP_ACK message includes a NETWORK_FINISH option comprising text enciphered with a session key $K=Y^x \bmod P$ calculated by an authentication server on the IP network.

8. The method recited in claim 3, wherein the NETWORK_ CONFIG option with the network configuration parameters comprises an assigned IP address, subnet mask, and default gateway router IP address, wherein at least the assigned IP address is enciphered with a session key $K=Y^x \bmod P$.

9. The method recited in claim 1 wherein the DHCP_OFFER message includes a key exchange triplet, and wherein the DHCP_REQUEST message includes a key exchange parameter.

10. A method of authenticating a mobile wireless IP host in an IP network, comprising:
receiving a broadcast dynamic host configuration protocol (DHCP)_DISCOVERY message including a HOST_HELLO message that specifies a plurality of cryptography options for the IP network including a host-to-network authentication method, network-to-host authentication method, key exchange algorithm, and encryption algorithm, wherein the DHCP_DISCOVERY message is received from the mobile wireless IP host over a wireless interface at an access point of the IP network;
responsive to receiving the dynamic host configuration protocol (DHCP)_DISCOVERY message, transmitting a DHCP_OFFER message including an option confirming the plurality of cryptography options when the plurality of cryptography options meet security requirements of the IP network, wherein the DHCP_OFFER message does not allocate an IP address to the mobile wireless IP host, wherein the DHCP_OFFER message is transmitted to the mobile wireless IP host over the wireless interface from the access point of the IP network;
after receiving the dynamic host configuration protocol (DHCP)_DISCOVERY message and after transmitting the DHCP_OFFER message, receiving a DHCP_RE-QUEST message including authentication credentials responsive to the DHCP_OFFER, wherein the DHCP_REQUEST message is received from the mobile wireless IP host over the wireless interface at the access point of the IP network;

responsive to receiving the DHCP_REQUEST message, authenticating the mobile wireless IP host; and responsive to authenticating the mobile wireless IP host, transmitting a DHCP_ACK message, the DHCP_ACK message including a NETWORK_CONFIG option with encrypted network configuration parameters, wherein the DHCP_ACK message is transmitted to the mobile wireless IP host over the wireless interface from the access point of the IP network.

11. The method recited in claim 10, wherein the DHCP_OFFER message includes a NETWORK_AUTH option containing a challenge number A and a Diffie-Helman (D-H) key exchange triplet <g, P, X>, where, $X=g^x \mod P$; x is a random secret generated by a secure IP access server on the network; g is a generator; P is a prime number yielding $P=2Q+1$; and Q is a prime number.

12. The method recited in claim 11, wherein the DHCP_REQUEST message includes a HOST_AUTH option including at least one of an IP host identifier, a challenge number B, and a D-H key exchange parameter Y, where $Y=g^y \mod P$ and y is a random secret generated by the mobile wireless IP host.

13. The method recited in claim 12, further comprising calculating a session key $K=X^y \mod P$.

14. The method recited in claim 12, wherein the DHCP_ACK message includes a NETWORK_AUTH option comprising B||Es(B), where B is enciphered with a secret key.

15. The method recited in claim 14, further comprising:
when the challenge B matches the response ES(B), receiving a DHCP_INFORM message with a HOST_FINISH option comprising text enciphered with the session key K, wherein the DHCP_INFORM message is received at the access point of the wireless network.

16. The method recited in claim 12, wherein the DHCP_ACK message includes a NETWORK_FINISH option comprising text enciphered with a session key $K=Y^x \mod P$ calculated by an authentication server on the IP network.

17. The method recited in claim 12, further comprising:
after receiving the DHCP_DISCOVERY message and after receiving the DHCP_REQUEST message, assigning an IP address for the mobile wireless IP host responsive to authenticating the mobile wireless IP host, wherein the NETWORK_CONFIG option with the network configuration parameters comprises the assigned IP address, subnet mask, and default gateway router IP address, wherein at least the assigned IP address is enciphered with a session key $K=Y^x \mod P$.

18. The method recited in claim 10 wherein the DHCP_OFFER message includes a key exchange triplet, and wherein the DHCP_REQUEST message includes a key exchange parameter.

* * * * *